UNITED STATES PATENT OFFICE.

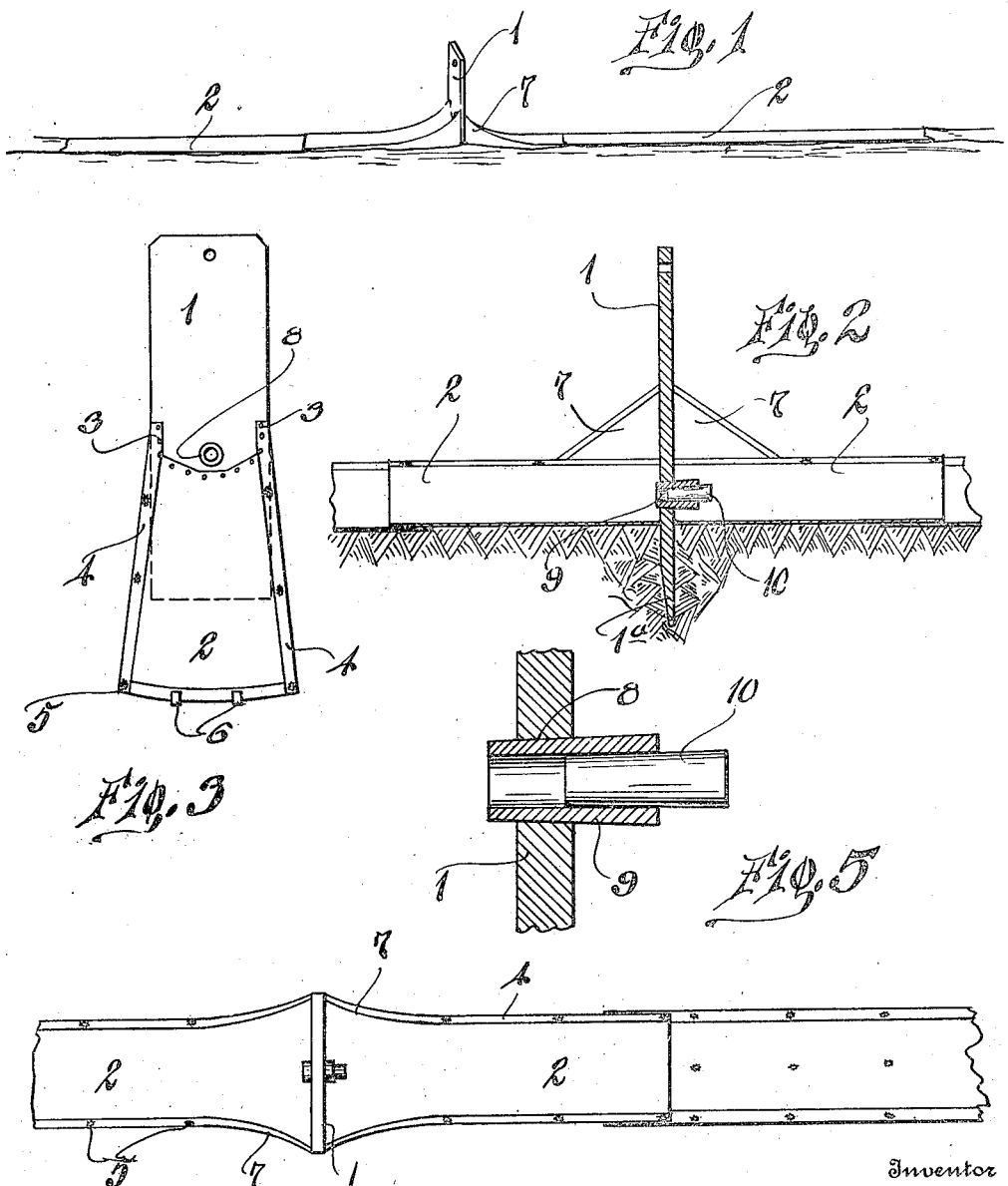

FRANK SULLIVAN, OF CUSICK, WASHINGTON.

IRRIGATION-REGULATOR.

1,375,240.

Specification of Letters Patent.   Patented Apr. 19, 1921.

Application filed October 9, 1919.  Serial No. 329,566.

*To all whom it may concern:*

Be it known that I, FRANK SULLIVAN, a citizen of the United States, residing at Cusick, in the county of Pend Oreille and State of Washington, have invented certain new and useful Improvements in Irrigation-Regulators, of which the following is a specification.

The present invention relates to an improved irrigation regulator designed especially for use in lateral ditches or sub-ditches of irrigation systems, for the purpose of regulating the flow of water through said ditches in accordance with the quantity of water required for the irrigation of the adjacent soil.

To this end the invention generally speaking involves the utilization of an abutment or obstruction to be placed in the ditch, which abutment is provided with variable means for increasing or diminishing the opening in the abutment for the flow of water therethrough. Thus the passage of water through the abutment may be governed or regulated according to the quantity of water required at the up side of the abutment as will be hereinafter more fully described and claimed.

The invention consists in certain novel combinations and arrangements of parts as shown in the accompanying drawings wherein the physical embodiment of the invention is illustrated according to the best mode so far devised for the practical application of the principles of the invention.

Figure 1 is a perspective view showing the subject matter of the invention in use in an irrigation ditch.

Fig. 2 is a longitudinal sectional view through the ditch and through the device of the invention.

Fig. 3 is a face view of the device.

Fig. 4 is a plan view of a ditch with the device in position therein.

Fig. 5 is a detail sectional view of the abutment and the regulating means therein for controlling the flow of water through the abutment.

The invention contemplates as an essential element the abutment 1, which may be a board having a somewhat shovel-shaped or wedge end 1ª, that is to be driven into the soil transversely of and through the ditch as indicated in Fig. 2.

At the sides of the abutment are secured a pair of aprons 2, 2, which are shown as nailed or tacked at 3 to the faces of the board, and the edges of these aprons are hemmed or provided with binding tapes 4 having eyelets 5 through which stakes or spikes may be driven to secure these aprons in position at the sides of the abutment, to form troughs in the ditch. In addition to these fastening devices the aprons are provided with weights 6, 6 attached at the respective outer ends of the aprons to hold the fabric of these flexible cloths on the bottom of the ditch. In Fig. 2 a pair of side braces 7, 7 are illustrated which may be made of tape or cord, and extend from the abutment 1 to the edges of the aprons some distance away in order to form diagonal braces between the abutment and the aprons.

An opening 8, preferably having tapering walls is provided centrally of the abutment and in position to be located above the bottom of the ditch when the abutment is driven into the soil. Through this opening or orifice the water may freely pass unless its flow is cut off when desired. The flow of water through this opening may be diminished by the interposition of a tapering tubular plug 9 inserted in the opening 8, or the flow may be entirely cut off by the insertion of the plug 10 into the bore of the tubular plug 9. Thus when the water is flowing in the direction of the arrow in Fig. 2 the abutment as shown will form a dam or closure to back up the water in the ditch sufficient for irrigation, and then when the later level arises above the plug 10, said plug may be removed to permit flow of water through the tubular plug 9. If now, a larger quantity of water than is desirable is held at the upstream side of the abutment 1, the tubular plug 9 may be removed to increase the flow, thus regulating the passage of water as desired.

In the drawings I have illustrated a flexible lining 11 for the ditch, which is preferably pervious to water, and the water seeps therethrough to irrigate the soil. It will readily be apparent that a number of these abutments may be used in the irrigation system, and that the abutment may be placed, removed, and replaced, in such locations as are desirable or necessary. The number of tubular plugs 9 may also be increased if desired, and it will readily be seen that these plugs of graduated sizes may nest one within the other, and the innermost or smallest tubular plug will of course receive the solid plug 10 when required.

What I claim is:

The combination in an irrigation regulator, of a board adapted to be driven into the bottom of a ditch and form an abutment, said board having an opening therethrough, detachable means for insertion into said opening for varying the area of said opening to control passage of water therethrough, flexible aprons attached to said board and adapted to form lateral troughs in the ditch, and bracing elements between said board and aprons.

In testimony whereof I affix my signature.

FRANK SULLIVAN.